United States Patent
Kimura (10) Patent No.: US 8,063,569 B2
(45) Date of Patent: Nov. 22, 2011

(54) DISCHARGE TUBE POWER SUPPLY APPARATUS AND SEMICONDUCTOR INTEGRATED CIRCUIT

(75) Inventor: Kengo Kimura, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 539 days.

(21) Appl. No.: 12/294,548

(22) PCT Filed: Apr. 23, 2008

(86) PCT No.: PCT/JP2008/057808
§ 371 (c)(1),
(2), (4) Date: Sep. 25, 2008

(87) PCT Pub. No.: WO2008/142943
PCT Pub. Date: Nov. 27, 2008

(65) Prior Publication Data
US 2010/0237792 A1    Sep. 23, 2010

(30) Foreign Application Priority Data
May 21, 2007    (JP) ................................. 2007-134089

(51) Int. Cl.
H02M 7/48    (2007.01)
H05B 41/24    (2006.01)
H05B 41/282    (2006.01)

(52) U.S. Cl. .................... 315/219; 315/209 R; 315/212; 315/194; 315/200 R (58) Field of Classification Search .................. 315/219, 315/209 R, 212, 194, 200 R
See application file for complete search history.

(56) References Cited

U.S. PATENT DOCUMENTS

| | | | |
|---|---|---|---|
| 5,619,402 A | 4/1997 | Liu | |
| 5,705,897 A * | 1/1998 | Hanazaki et al. | 315/307 |
| 7,439,689 B2 * | 10/2008 | Honda et al. | 315/307 |

FOREIGN PATENT DOCUMENTS

| | | |
|---|---|---|
| JP | 10 50489 | 2/1998 |
| JP | 2000 286687 | 10/2000 |
| JP | 2002 151287 | 5/2002 |
| JP | 2002 221701 | 8/2002 |
| JP | 2005 71681 | 3/2005 |
| JP | 2006 136044 | 5/2006 |
| JP | 2006 164785 | 6/2006 |

* cited by examiner

Primary Examiner — Daniel D Chang
(74) Attorney, Agent, or Firm — Oblon, Spivak, McClelland, Maier & Neustadt, L.L.P.

(57) ABSTRACT

An AC conversion circuit includes a main transformer having a primary winding and a secondary winding to electrically insulate the AC power source side and the discharge tube side from each other, an IC1 arranged on the AC power source side, a plurality of switching elements arranged on the AC power source side and driven by the IC1, to pass a current through the primary winding of the main transformer based on the DC power, an IC2 arranged on the discharge tube side, to generate a pair of rectangular-wave signals for conducting PWM control on a current passing through the discharge tube and having the same pulse width with a duty ratio of less than 50% and a phase difference of about 180 degrees, and one or more signal transfer insulated elements to send the pair of rectangular-wave signals from the IC2 to the IC1. The IC1 drives the plurality of switching elements according to the pair of rectangular-wave signals from the one or more signal transfer insulated elements, so that positive-negative symmetrical AC power is supplied from the secondary winding of the main transformer to the discharge tube.

11 Claims, 10 Drawing Sheets

DISCHARGE TUBE POWER SUPPLY APPARATUS AND SEMICONDUCTOR INTEGRATED CIRCUIT

TECHNICAL FIELD

The present invention relates to a discharge tube power supply apparatus and a semiconductor integrated circuit, to supply power to a discharge tube such as a cold cathode tube used for, in particular, a liquid crystal display unit.

BACKGROUND TECHNOLOGY

Figure 1:
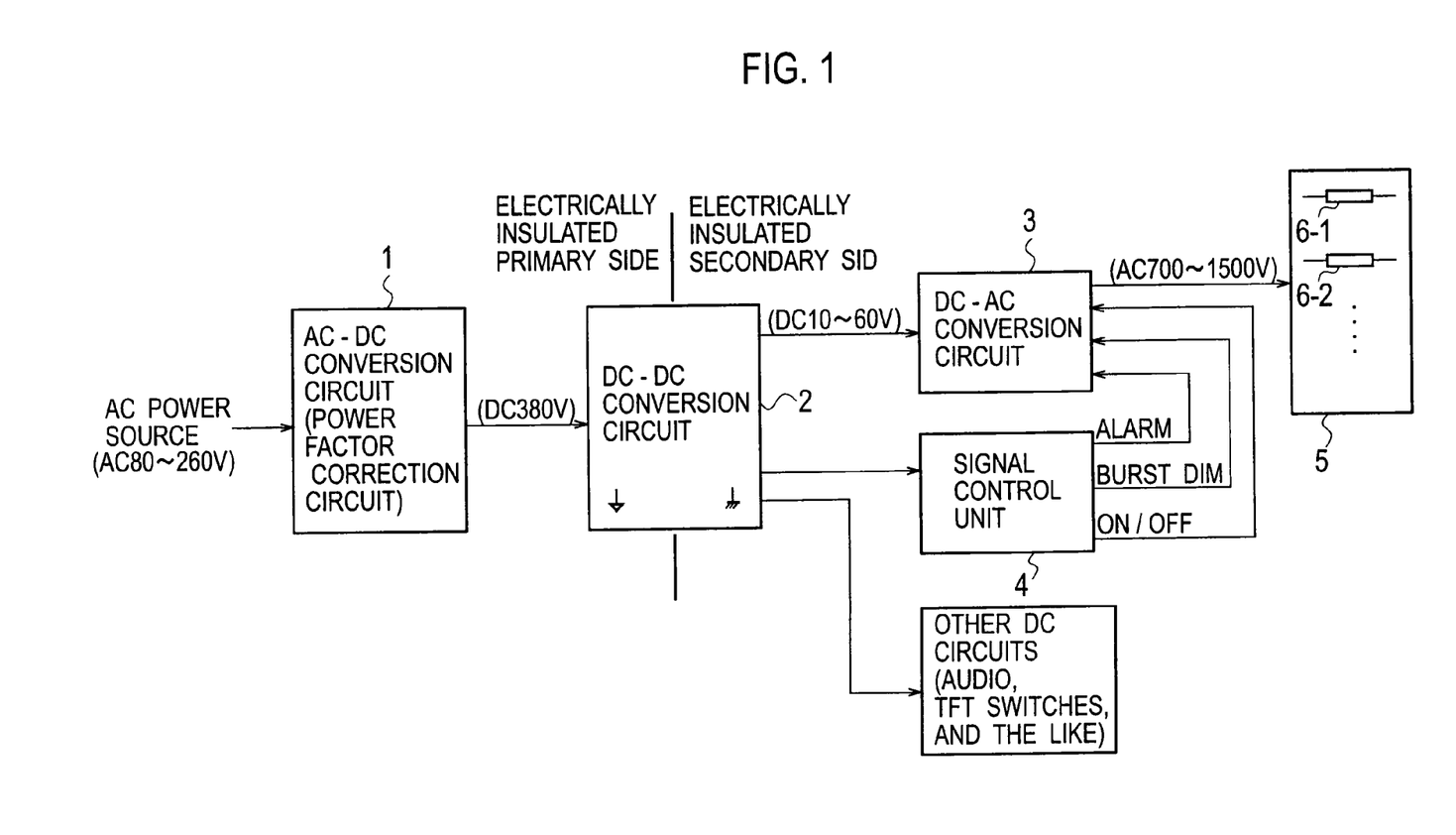
FIG. 1 is a circuit diagram illustrating the configuration of a discharge tube power supply apparatus according to a related art.

FIG. 1 is a circuit diagram illustrating the configuration of a discharge tube power supply apparatus according to a related art. The discharge tube power supply apparatus illustrated in FIG. 1 supplies power from an AC power source to a discharge tube used for, for example, a liquid crystal display unit.

In FIG. 1, an external AC power source supplies an AC voltage of 80 to 260 V, which is converted by an AC-DC conversion circuit 1 consisting of a power factor correction circuit into a DC voltage of 380 V. The DC voltage of 380 V from the AC-DC conversion circuit 1 is converted by a DC-DC conversion circuit 2 having an insulated transformer into a DC voltage of 10 to 60 V, which is sent to a secondary side of the electrically insulated transformer.

On the secondary side of the electrically insulated transformer, a DC-AC conversion circuit 3 is arranged to convert the DC voltage of 10 to 60V into an AC voltage of about 700 to 1500 V, which is applied to discharge tubes such as cold cathode tubes 6-1, 6-2, . . . arranged inside a panel 5.

Other related arts are described in, for example, Japanese Unexamined Patent Application Publications No. 2005-71681 and No. H10-50489.

DISCLOSURE OF INVENTION

The apparatus illustrated in FIG. 1, however, passes the AC power supplied to the discharge tubes through the DC-DC conversion circuit 2, to deteriorate conversion efficiency due to a power loss caused by the DC-DC conversion circuit 2. In particular, a liquid crystal display unit that employs a large panel that needs large AC power for a backlight (discharge tubes) demonstrates a drastic decrease in conversion efficiency.

The present invention provides a discharge tube power supply apparatus and a semiconductor integrated circuit those employ no DC-DC conversion circuit and are easy to design, inexpensive, and highly efficient.

Means to Solve the Problems

To solve the problems, the present invention provides a discharge tube power supply apparatus for converting AC power of an AC power source into DC power by a DC conversion circuit, converting the converted DC power into AC power by an AC conversion circuit, and supplying the converted AC power to a discharge tube. The AC conversion circuit includes a main transformer having a primary winding arranged on an AC power source side and a secondary winding arranged on a discharge tube side, the primary and secondary windings electrically insulating the AC power source side and the discharge tube side from each other, a drive unit arranged on the AC power source side, a plurality of switching elements arranged on the AC power source side and driven by the drive unit, to pass a current to the primary winding of the main transformer based on the DC power, a control unit arranged on the discharge tube side, to generate at least a pair of rectangular-wave signals that are used to conduct PWM control on the current passed to the discharge tube and have the same pulse width with a duty ratio of less than 50% and a phase difference of about 180 degrees, and one or more signal transfer insulated elements to send the pair of rectangular-wave signals from the control unit to the drive unit. The drive unit drives the plurality of switching elements according to the pair of rectangular-wave signals from the one or more signal transfer insulated elements, so that positive-negative symmetrical AC power is supplied from the secondary winding of the main transformer to the discharge tube.

BEST MODE OF IMPLEMENTING INVENTION

Discharge tube power supply apparatuses and semiconductor integrated circuits according to embodiments of the present invention will be explained in detail with reference to the drawings.

Embodiment 1

Figure 2:
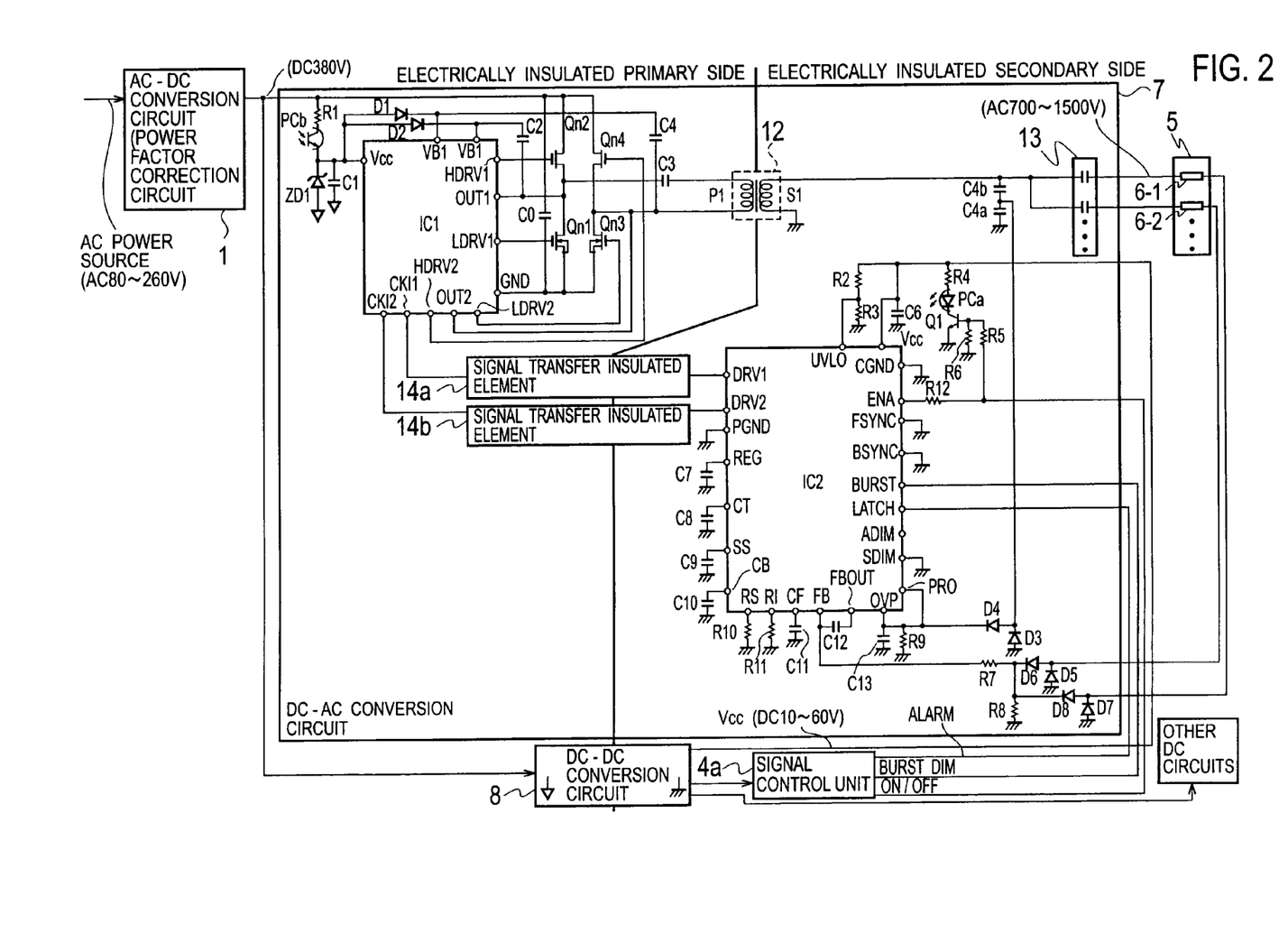
FIG. 2 is a circuit diagram illustrating the configuration of a discharge tube power supply apparatus according to Embodiment 1 of the present invention.

FIG. 2 is a circuit diagram illustrating a discharge tube power supply apparatus according to Embodiment 1 of the present invention. The discharge tube power supply apparatus illustrated in FIG. 2 has an AC-DC conversion circuit 1 (corresponding to the DC conversion circuit) having a power factor correction circuit to convert an AC voltage of 80 to 260 V of an AC power source into a DC voltage of 380 V and a DC-AC conversion circuit 7 (corresponding to the AC conversion circuit) to convert the DC voltage of 380 V converted by the AC-DC conversion circuit 1 into an AC voltage of 700 to 1500 V and supply the converted AC voltage to discharge tubes such as cold cathode tubes 6-1, 6-2, . . . (hereinafter abridged as "6") arranged inside a panel 5.

The DC-AC conversion circuit 7 includes a main transformer 12, an IC1 (corresponding to the drive unit) which is a semiconductor integrated circuit arranged on an AC power source side (electrically insulated primary side), four switching elements Qn1 to Qn4 of bridge configuration arranged on the AC power source side, an IC 2 (corresponding to the control unit) which is a semiconductor integrated circuit arranged on a discharge tube side (electrically insulated secondary side), signal transfer insulated elements 14a and 14b, and a current dividing circuit 13. The main transformer 12 has a primary winding P1 arranged on the AC power source side and a secondary winding S1 arranged on the discharge tube side, to electrically insulate the AC power source side and the discharge tube side from each other.

The four switching elements Qn1 to Qn4 are n-type MOSFETs and are driven by the IC1, to pass a current to the primary winding P1 of the main transformer 12 and a capacitor C3 based on the DC voltage of 380 V.

The IC2 is arranged on the discharge tube side and generates a pair of rectangular-wave signals that are used to conduct PWM control on a current passed to the discharge tubes 6 and have the same pulse width with a duty ratio of less than 50% and a phase difference of about 180 degrees.

The signal transfer insulated elements 14a and 14b send the pair of rectangular-wave signals from DRV1 and DRV2 terminals of the IC2 to CKI1 and CKI2 terminals of the IC1. The IC1 drives the switching elements Qn1 to Qn4 according to the pair of rectangular-wave signals from the signal transfer insulated elements 14a and 14b, so that the secondary winding S1 of the main transformer 12 supplies positive-negative symmetrical AC power to the discharge tubes 6.

A DC-DC conversion circuit 8 converts the DC voltage of 380 V converted by the AC-DC conversion circuit 1 into a DC voltage of 10 to 60 V and supplies the converted DC voltage as a power source Vcc to the IC2 and a series circuit including a resistor R4, a photocoupler diode PCa, and a transistor Q1. An ENA terminal of the IC2 is connected through a resistor R12 to a signal control unit 4a. The signal control unit 4a is connected through a resistor R5 to a base of the transistor Q1. The DC power source of 380 V is supplied through a resistor R1 and a photocoupler transistor PCb to a Vcc terminal of the IC1. The signal control unit 4a receives the DC voltage from the DC-DC conversion circuit 8 to generate a BURST signal and an ON/OFF signal, which are supplied to a BURST terminal and the ENA terminal of the IC2, respectively. The signal control unit 4a receives an ALARM signal from a LATCH terminal of the IC2.

The details of the AC-DC conversion circuit 7 will be explained. Between an output (DC power source of 380 V) of the AC-DC conversion circuit 1 and the ground, there is connected a series circuit including the high-side switching element Qn2 and low-side switching element Qn1. Between the output (DC power source of 380 V) of the AC-DC conversion circuit 1 and the ground, there is connected a series circuit including the high-side switching element Qn4 and low-side switching element Qn3.

Between a connection point of the switching elements Qn1 and Qn2 and a connection point of the switching elements Qn3 and Qn4, there is connected a series circuit including the capacitor C3 and the primary winding P1 of the main transformer 12. A drain of the switching element Qn2 and a drain of the switching element Qn4 receive the DC power source of 380 V. A gate of the switching element Qn2 is connected to an HDRV1 terminal of the IC 1 and a gate of the switching element Qn1 is connected to an LDRV1 terminal of the IC1. A gate of the switching element Qn4 is connected to an HDRV2 terminal of the IC1 and a gate of the switching element Qn3 is connected to an LDRV2 terminal of the IC1.

A connection point of the switching elements Qn1 and Qn2 is connected to an OUT1 terminal of the IC1 and a connection point of the switching elements Qn3 and Qn4 is connected to an OUT2 terminal of the IC1.

A first end of the secondary winding S1 of the main transformer 12 is connected through the current dividing circuit 13 to first electrodes of the discharge tubes 6. Second ends of the discharge tubes 6 are connected to diodes D5 to D8. The diodes D5 to D8 and a resistor R8 form a tube current detection circuit to detect a current passing through the discharge tubes 6-1, 6-2, . . . and provide a resistor R7 and an FB terminal of the IC2 with a voltage proportional to the detected current.

Between the first end of the main transformer 12 and the ground, there is connected a series circuit including capacitors C4a and C4b. A connection point of the capacitors C4a and C4b is connected to diodes D3 and D4. The diode D4, a resistor R9, and a capacitor C13 form a rectifying-smoothing circuit to detect a voltage proportional to an output voltage and provide an OVP terminal of the IC2 with the detected voltage.

Unlike SMPS (switching mode power supply), the DC-AC conversion circuit (inverter) 7 for lighting the discharge tubes 6 needs, as power supply control signals from the electrically insulated secondary side, an OVP signal for detecting an inverter output voltage and a discharge tube voltage, a standby ON/OFF signal, and a burst dimming signal for adjusting the brightness of the discharge tubes 6, in addition to a tube current feedback signal. Depending on the specifications of a liquid crystal display unit, an analog dimming signal, an inverter oscillation frequency synchronizing signal, an abnormality detection signal, and the like will also be needed.

Detailed Configuration and Operation of IC2

Figure 4A:
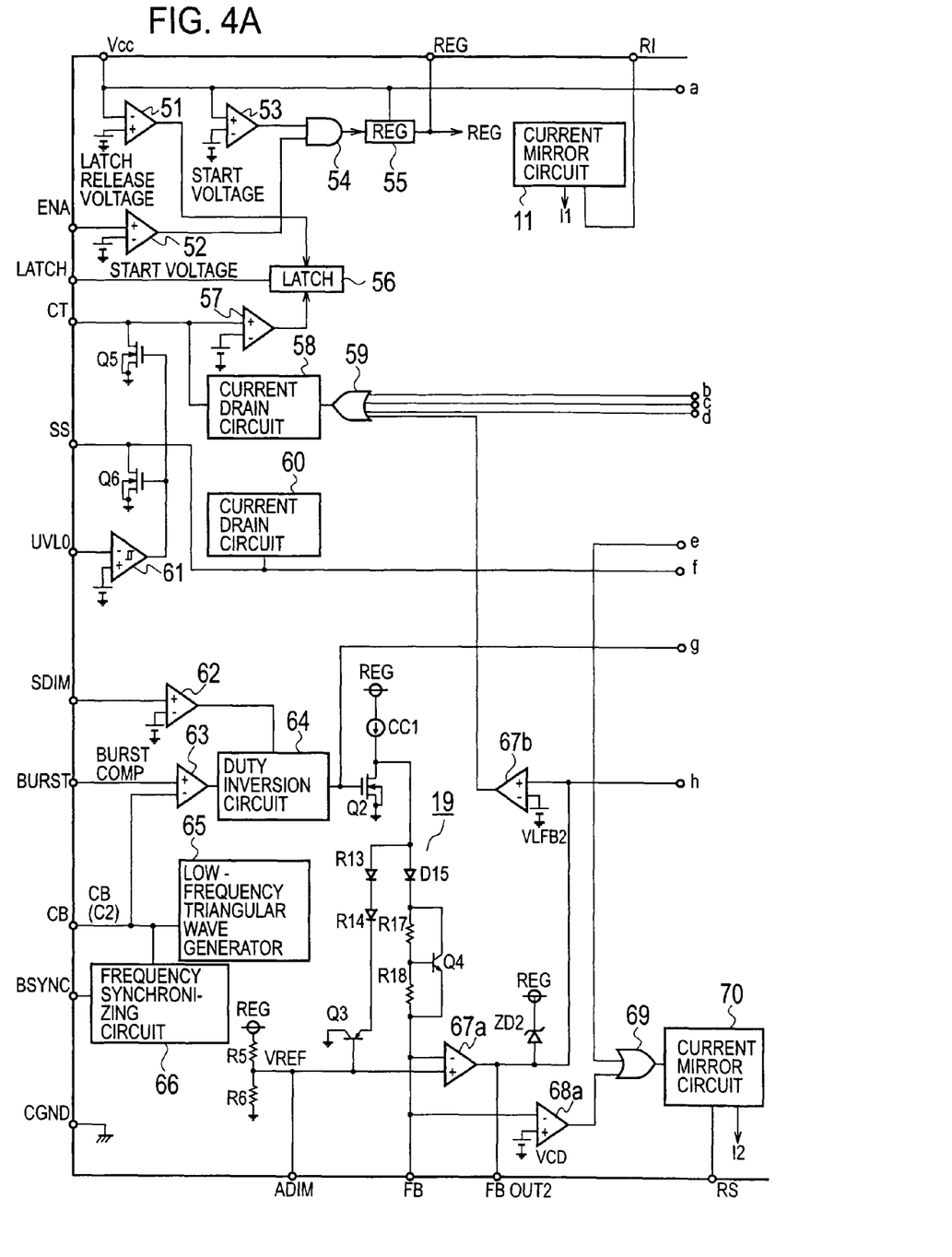
FIG. 4A is a view illustrating a part of an IC 2 arranged in the discharge tube power supply apparatus of Embodiment 1.
Figure 4B:
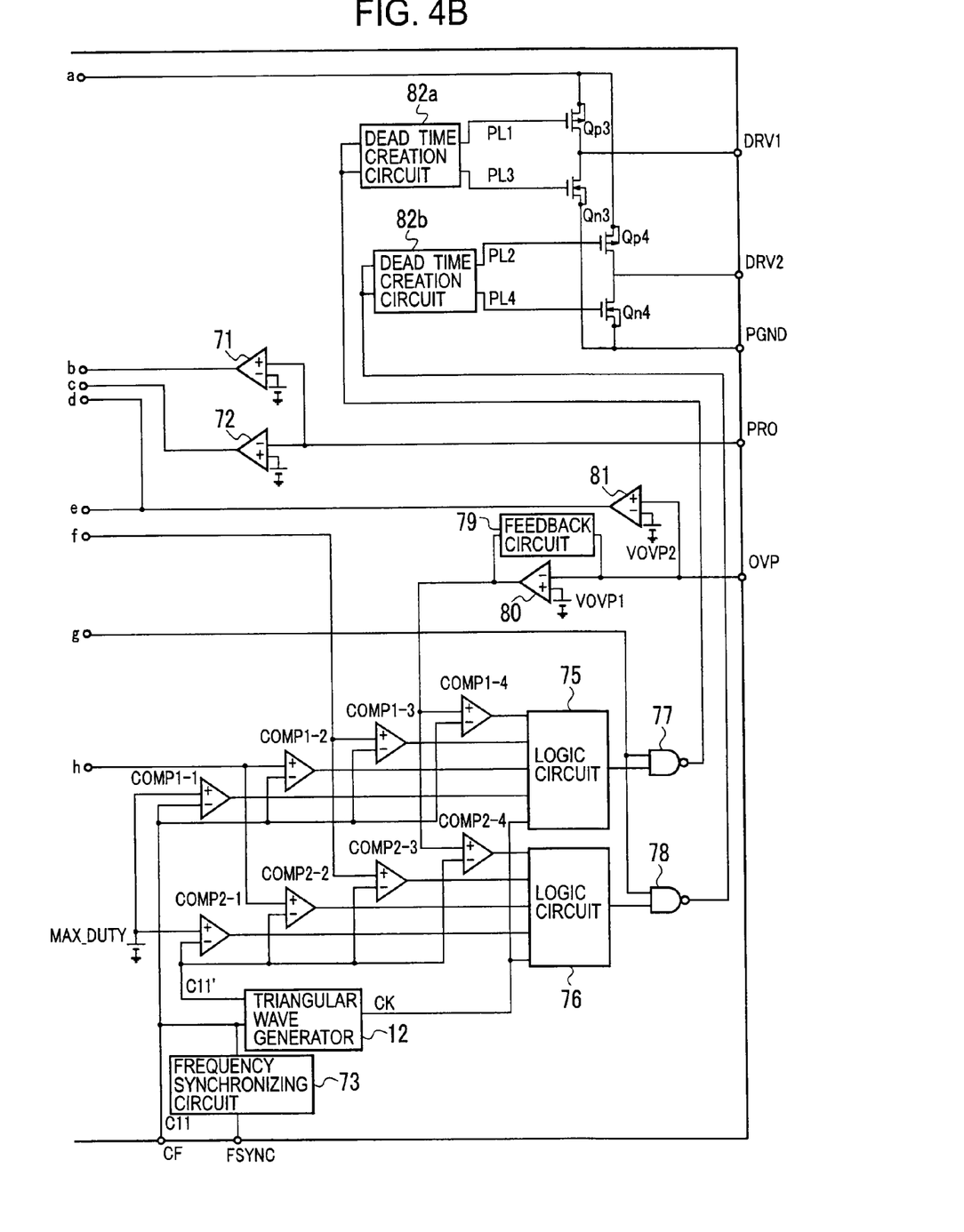
FIG. 4B is a view illustrating the remaining part of the IC 2 arranged in the discharge tube power supply apparatus of Embodiment 1.

FIG. 4A is a view illustrating a part of the IC 2 arranged in the discharge tube power supply apparatus of Embodiment 1 and FIG. 4B is a view illustrating the remaining part of the IC 2 arranged in the discharge tube power supply apparatus of Embodiment 1. Marks "a" to "h" depicted in FIG. 4A correspond to marks "a" to "h" in FIG. 4B and the same marks are connected to each other.

The IC2 has an error voltage amplifier 67a, PWM comparators COMP1-1 to 1-4 and 2-1 to 2-4, logic circuits 75 and 76, and NAND gates 77 and 78. The error voltage amplifier 67a amplifies an error voltage between a rectified-smoothed voltage input from the FB terminal, i.e., a voltage corresponding to a current passing through the discharge tubes and a reference voltage and outputs the amplified error voltage. The PWM comparator COMP1-2 compares the error voltage from the error voltage amplifier 67a with a triangular-wave signal from a triangular-wave generator 12 and generates a PWM control signal having a pulse width corresponding to a current passed to the discharge tubes 6. The NAND gate 77 inverts the PWM control signal passed through the logic circuit 75 and sends the inverted signal through a dead time creation circuit 82a for creating a predetermined dead time to the gates of switching elements Qp3 and Qn3 connected in series.

The PWM comparator COMP2-2 compares the error voltage from the error voltage amplifier 67a with an inverted signal formed by inverting the triangular-wave signal of the triangular-wave generator 12 with respect to a midpoint of the upper and lower limit values thereof and generates a PWM control signal having a pulse width corresponding to a current passed to the discharge tubes 6. The NAND gate 78 inverts the PWM control signal passed through the logic circuit 76 and sends the inverted signal through a dead time creation circuit 82b for creating a predetermined dead time to the gates of switching elements Qp4 and Qn4 connected in series.

In the IC2, a Vcc terminal voltage is supplied to a comparator 53 and an ENA terminal voltage is supplied to a comparator 52. When the Vcc terminal voltage and ENA terminal voltage become equal to or larger than a predetermined start voltage, an AND gate 54 provides a high-level output to start an internal regulator 55 so that a REG terminal voltage is supplied to various parts.

If the ENA terminal voltage is lower than the predetermined start voltage, the AND gate 54 stops the Vcc terminal voltage and the internal regulator 55 reduces standby power consumption of the IC2 as close to zero as possible.

When the internal regulator 55 starts, the circuits in the IC2 start to operate as mentioned below.

In a steady state, a constant current determination resistor R11 connected to an RI terminal and a current mirror circuit 11 optionally determine a current I1 and a constant current determination resistor R10 connected to an RS terminal and a current mirror circuit 70 optionally determine a current I2. A total current of the currents I1 and I2 charges and discharges an oscillator capacitor C11 connected to a CF terminal, to generate the triangular-wave signal. This triangular-wave signal rises and falls at the same inclination.

On the other hand, a current passing through the discharge tubes 6 is converted by the resistor R8 into a voltage, which is sent through the resistor R7 to the FB terminal. When the discharge tubes 6 start to pass a current, the FB terminal increases voltage. When the FB terminal voltage exceeds a voltage VCD that is set to be lower than the reference voltage VREF (formed by dividing the power source voltage REG by resistors R5 and R6) of the error amplifier 67a, a comparator 68a provides a low-level (L-level) output. At this time, if an OVP terminal voltage is lower than a reference voltage VOVP2 of an OVP comparator 81, an OR circuit 69 provides a low-level output.

As a result, the current I2 from the current mirror 70 stops, and the charging and discharging of the capacitor C11 are carried out only with the current I1. Namely, in a start time until a current normally passes through the discharge tubes 6, a voltage is applied to the discharge tubes 6 at an oscillation frequency higher than a steady-state oscillation frequency, to thereby the gain of a series resonant circuit is increased. This increases an output voltage, and with a proximity effect of the panel 5, i.e., a load, improves the lighting performance of the discharge tubes 6.

The triangular wave C11 is supplied to negative input terminals (depicted by "−") of the PWM comparators COMP1-1, COMP1-2, COMP1-3, and COMP1-4. The inverted signal C11' formed by inverting the triangular-wave signal CF (C11) with respect to a midpoint of the upper and lower limit values thereof is supplied to negative input terminals (depicted by "−") of the PWM comparators COMP2-1, COMP2-2, COMP2-3, and COMP2-4.

Just after a rise of the REG voltage, a soft start capacitor C9 connected to an SS terminal starts to charge with a constant current and the voltage of the capacitor C9 gradually increases. The voltage of the capacitor C9 at the SS terminal is supplied to positive input terminals (depicted by "+") of the PWM comparators COMP1-3 and COMP 2-3. Each of the PWM comparators COMP1-3 and COMP 2-3 compares the voltages at the positive input terminal "+" and the negative input terminal "−" thereof with each other and converts the result into a pulse voltage.

The FB terminal is connected to an inverting terminal (depicted by "−") of the error amplifier 67a. An FBOUT terminal that is an output of the error amplifier 67a is connected to positive input terminals (depicted by "+") of the PWM comparators 1-2 and 2-2. Each of the PWM comparators 1-2 and 2-2 compares the voltages at the positive input terminal "+" and the negative input terminal "−" thereof with each other and converts the result into a pulse voltage.

Figure 5:
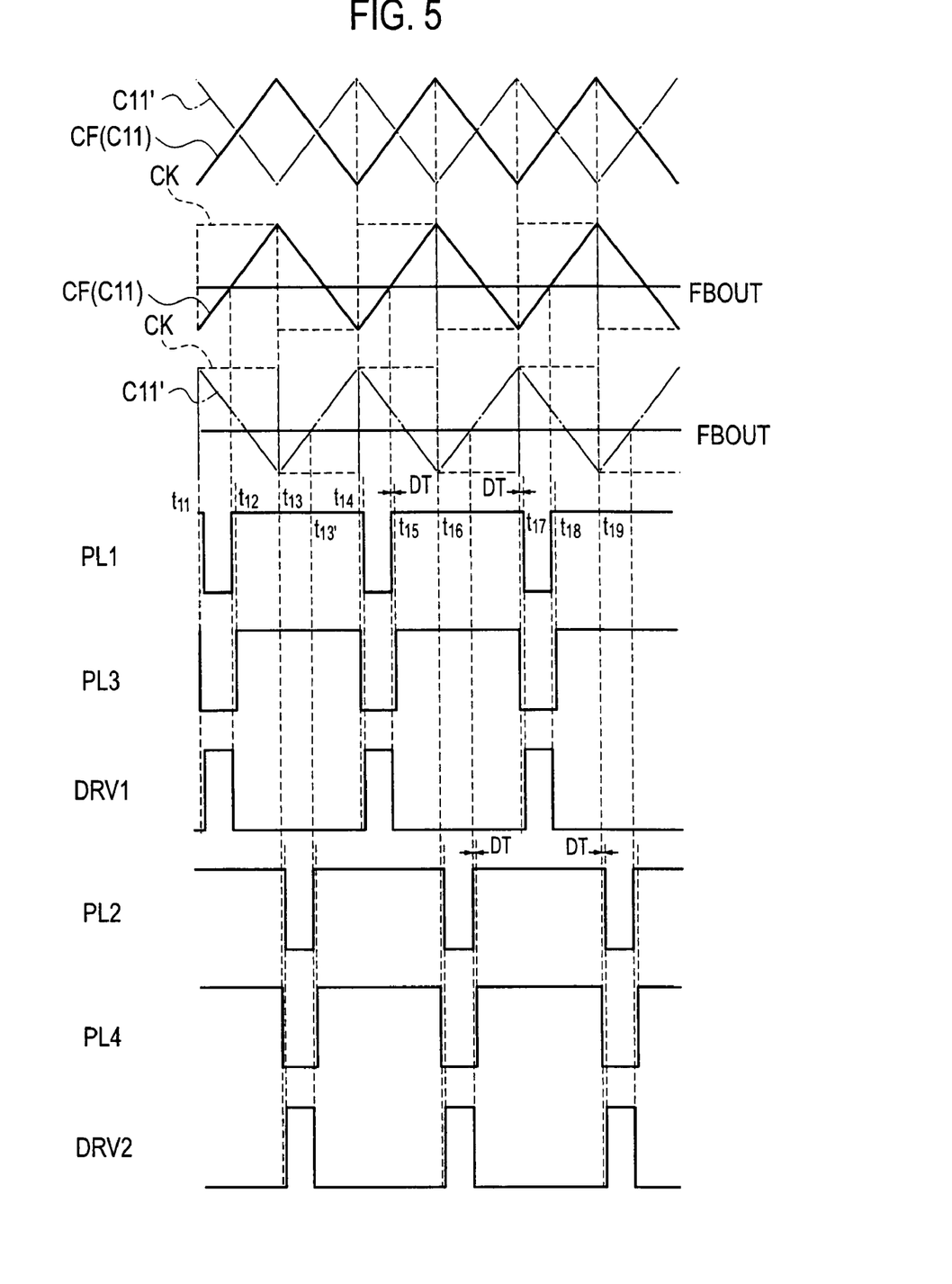
FIG. 5 is an operational waveform diagram illustrating signals concerning the IC 2 arranged in the discharge tube power supply apparatus of Embodiment 1.

At this time, the triangular-wave signal CF (C11), a clock signal CK provided by the triangular-wave generator 12, pulse signals PL1 to PL4 for driving the switching elements Qp3, Qn3, Qp4, and Qn4, the first rectangular-wave signal DRV1, and the second rectangular-wave signal DRV2 have waveforms illustrated in FIG. 5. The first rectangular-wave signal DRV1 is a signal from a connection point of the switching elements Qp3 and Qn3. The second rectangular-wave signal DRV2 is a signal from a connection point of the switching elements Qp4 and Qn4. A capacitor C12 between the FB terminal and the FBOUT terminal conducts phase compensation of the error amplifier 67a.

Each output voltage of the discharge tube power supply apparatus is divided by the capacitors C4a and C4b, is rectified and smoothed, and is supplied to the OVP terminal. The voltage supplied to the OVP terminal is amplified by an amplifier 80 and the amplified voltage is supplied to positive input terminals "+" of the PWM comparators COMP1-4 and COMP2-4. Each of the PWM comparators 1-4 and 2-4 compares the voltages at the positive input terminal and the negative input terminal thereof with each other and converts the result into a pulse voltage.

The PWM comparators COMP1-1 and COMP2-1 are comparators to determine a maximum ON duty. A maximum duty voltage MAX_DUTY, which is set to be slightly lower than the upper limit voltage of the triangular-wave signal CF (C11) and inverted signal CF (C11') formed by inverting the triangular-wave signal CF (C11) at a midpoint of the upper and lower limit values thereof, is supplied to a positive input terminal (depicted by "+") of each of the PWM comparators COMP1-1 and COMP2-1. Each of the PWM comparators COMP1-1 and COMP2-1 compares the voltages at the positive input terminal "+" and negative input terminal "−" thereof with each other and converts the result into a pulse voltage.

Among the output pulse voltages of the PWM comparators COMP1-1, COMP1-2, COMP1-3, and COMP1-4, a shortest pulse width is selected by the logic circuit 75 and is supplied through the NAND gate 77 to the dead time creation circuit 82a. The dead time creation circuit 82a creates a first pulse signal PL1 and a third pulse signal PL3 having a predetermined dead time with respect to the first pulse signal PL1. These pulse signals are supplied to the switching elements Qp3 and Qn3, respectively. When the first pulse signal PL1 is low, the switching element Qp3 turns on to make the first rectangular-wave signal DRV1 high. When the first pulse signal PL1 is high, the switching element Qn3 turns on to make the first rectangular-wave signal DRV1 low. As a result, only during a rise period of the triangular-wave signal CF (C11), the output pulse voltage is sent to the DRV1 terminal.

Among the output pulse voltages of the PWM comparators COMP2-1, COMP2-2, COMP2-3, and COMP2-4, a shortest pulse width is selected by the logic circuit 76 and is supplied through the NAND gate 78 to the dead time creation circuit 82b. The dead time creation circuit 82b creates a second pulse signal PL2 and a fourth pulse signal PL4 having a predetermined dead time with respect to the second pulse signal PL2. These pulse signals are supplied to the switching elements Qp4 and Qn4, respectively. When the second pulse signal PL2 is low, the switching element Qp4 turns on to make the second rectangular-wave signal DRV2 high. When the second pulse signal PL2 is high, the switching element Qn4 turns on to make the second rectangular-wave signal DRV2 low. As a result, only during a rise period of the inverted signal C11', the output pulse voltage is sent to the DRV2 terminal.

Through the above-mentioned operations, the switching elements Qp3 and Qn3 alternately turn on/off and the switching elements Qp4 and Qn4 alternately turn on/off. These switching operations are carried out according to the waveform of the triangular-wave signal CF (C11) at the same frequency and the same phase based on respective pulse widths determined by the feedback control of the error amplifier 67a, so that a current passing through the discharge tubes 6 is controlled to a predetermined value.

When the output of the discharge tube power supply apparatus is open, the voltage of the OVP terminal increases, and when it reaches the reference voltage VOVP1 of the amplifier 80, the feedback control of the amplifier 80 controls the open output voltage of the discharge tube power supply apparatus to a predetermined value.

If the output of the discharge tube power supply apparatus is open and if the OVP terminal exceeds VOVP2, the comparator 81 provides an OR gate 59 with a high-level output. Then, the OR gate 59 provides a high-level (H-level) output to let a current drain circuit 58 pass a current. As a result, a timer capacitor C8 connected to a CT terminal starts to charge with a constant current, so that the voltage of the capacitor C8 gradually increases.

A PRO terminal is connected to window comparators 71 and 72. In combination with an optional application, the window comparators 71 and 72 are capable of detecting various abnormal states such as an overcurrent passing to the main transformer 12 and a low output voltage state of the discharge tube power supply apparatus. If a voltage at the PRO terminal exceeds a threshold value of any one of the window comparators 71 and 72, the timer capacitor C8 connected to the CT terminal starts to charge with a constant current through the OR gate 59 and current drain circuit 58, so that the voltage of the capacitor C8 gradually increases.

When the voltage of the CT terminal exceeds a threshold voltage, a comparator 57 provides a latch circuit 56 with a high-level output and the outputs (DRV1 and DRV2) of the IC 2 are stopped in a latch mode. If the abnormal state returns to a normal state during the operation of the timer, the charge of the timer capacitor C8 is reset. If the voltage at the Vcc terminal becomes lower than a latch release voltage, a comparator 51 provides the latch circuit 56 with a high-level output to release the latch mode.

A LATCH terminal is in a high-level state during a normal operation, and if the IC2 enters a latch mode, changes to a low-level state to inform other control circuits and systems of the detected abnormal state.

Figure 6:
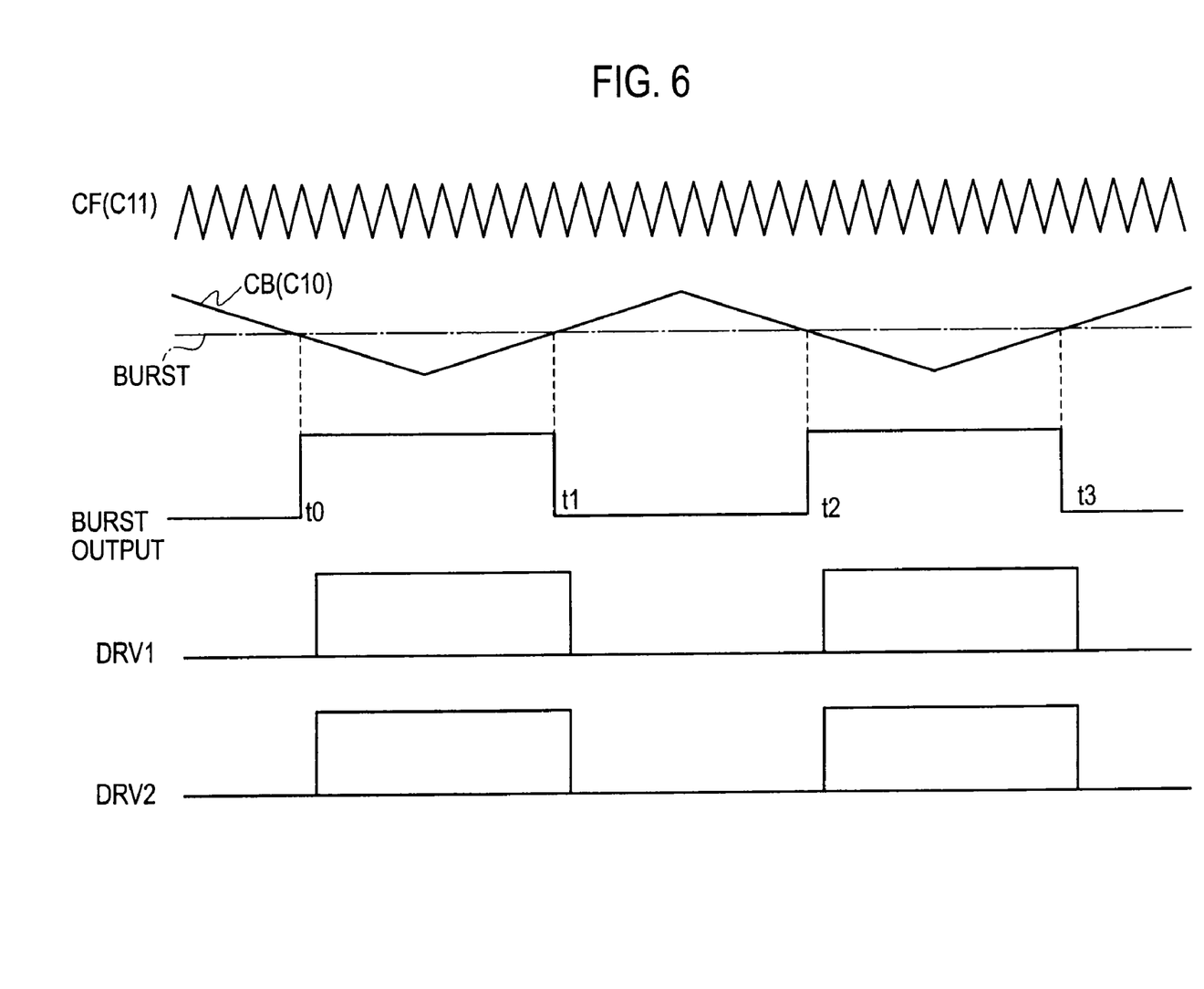
FIG. 6 is an operational waveform diagram illustrating a burst dimming operation of the IC 2 arranged in the discharge tube power supply apparatus of Embodiment 1.

Burst dimming will be explained. FIG. 6 illustrates operational waveforms of the burst dimming of the discharge tube power supply apparatus according to Embodiment 1. The constant current determination resistor R11 connected to the RI terminal and the current mirror circuit 11 optionally set the current I1. The current I1 charges and discharges a low-frequency oscillator capacitor C10 connected to a CB terminal, to generate a low-frequency triangular-wave signal. The low-frequency triangular-wave signal rises and falls at the same inclination.

A burst dimming comparator 63 compares the voltage of the capacitor C10 at the CB terminal with a voltage supplied to a BURST terminal. If the voltage of the BURST terminal is lower than the voltage of the capacitor C10, the comparator 63 provides a gate of an n-type FET Q2 with a low-level output. Since the n-type FET Q2 is OFF, a current passes through a route extending along REG, CC1, D15, Q4, R7, R8, and the ground. Namely, the FB terminal passes a current and a voltage at the inverting terminal of the error amplifier 67a is set to a voltage slightly higher than a voltage at the non-inverting terminal thereof determined by a clamp circuit 19. As a result, the output FBOUT of the error amplifier 67a operates to reduce power supplied to the discharge tubes 6.

A Zener diode ZD2 clamps the output FBOUT of the error amplifier 67a so that it does not become lower than the lower limit value of the triangular-wave signal, and the PWM comparators COMP1-2 and COMP2-2 stand by in a state to output a very short PWM control signal. In this state, the logic circuits 75 and 76 stop the PWM control signals, thereby turning off output oscillation. If the voltage of the BURST terminal is a pulse signal exceeding upper and lower limit values of the capacitor C10, or if it is a DC voltage within the range of the upper and lower limit values of the capacitor C10, the FB terminal passes a pulse current to intermittently oscillate output, thereby reducing power supply and carrying out the burst dimming.

When the burst dimming is turned on, the capacitor C12 between the FB terminal and the FBOUT terminal and the resistors R7 and R8 make the error amplifier 67a operate as an integration circuit. As the output voltage of the error amplifier 67a gradually increases, the voltage and current of the discharge tubes 6 gradually increase. This enables the operation to quickly start from a soft start operation that prevents the discharge tubes 6 from receiving excessive stress.

An ADIM terminal is connected to the non-inverting terminal "+" of the error amplifier 67a. A variable voltage supplied to the ADIM terminal can vary the reference voltage of the error amplifier 67a in up and down directions, to conduct current dimming in a wide range.

A UVLO terminal is connected to a comparator (Schmitt trigger) 61 having a hysteresis characteristic. If a voltage at the UVLO terminal is lower than a predetermined voltage, an n-type FET Q5 turns on and the comparator 57 provides the latch circuit 56 with a low-level output. Namely, a signal to the latch circuit 56 is disconnected. Also, an SS terminal is set to low to turn off the output of the IC2. If the voltage at the UVLO terminal is equal to or higher than the predetermined voltage, the signal to the latch circuit 56 and the signal to make the SS terminal low are released, to turn on the output of the IC2 from the soft start operation. Supplying a voltage proportional to an input power source voltage of the discharge tube power supply apparatus to the UVLO terminal results in carrying out a UVLO operation of the input power source voltage of the discharge tube power supply apparatus.

An FSYNC terminal that is an external synchronizing signal input terminal is connected to a frequency synchronizing circuit 73 and the triangular-wave signal CF (C11) oscillates at the frequency of a pulse signal supplied to the FSYNC terminal. A BSYNC terminal that is an external synchronizing signal input terminal is connected to a frequency synchronizing circuit 66 and the triangular-wave signal CB (C10) oscillates at the frequency of a pulse signal supplied to the BSYNC terminal. A PGND terminal is the ground for the switching elements Qp3, Qp4, Qn3, and Qn4. A CGND terminal is the ground for the IC 2 except for the switching elements Qp3, Qp4, Qn3, and Qn4.

(Detailed Configuration and Operation of IC 1)

Figure 3:
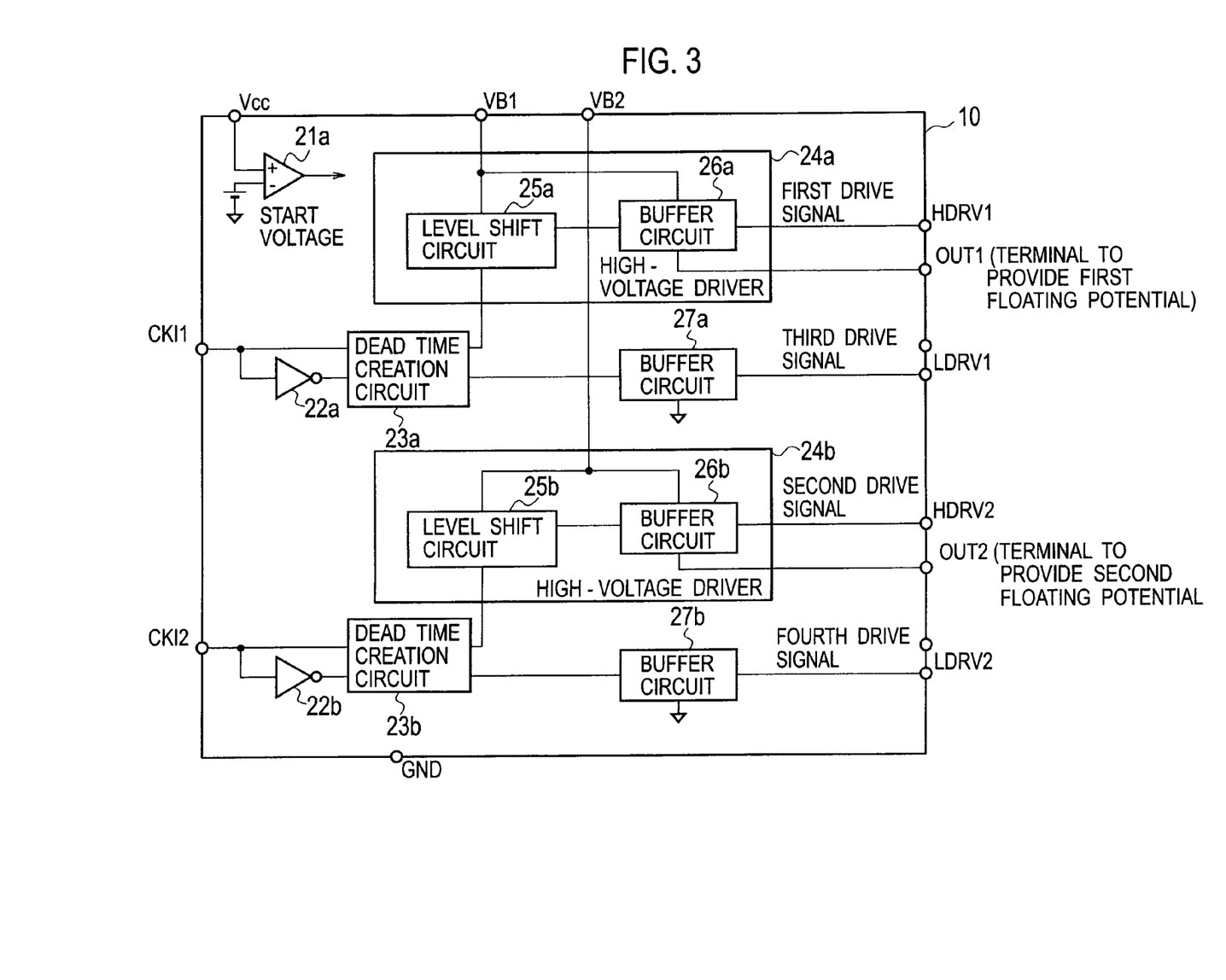
FIG. 3 is a view illustrating an IC 1 arranged in the discharge tube power supply apparatus of Embodiment 1.

FIG. 3 is a view illustrating the IC 1 arranged in the discharge tube power supply apparatus according to Embodiment 1. The IC 1 includes a comparator 21a connected to the Vcc terminal, an inverter 22a and a dead time creation circuit 23a connected to the CKI1 terminal, an inverter 22b and a dead time creation circuit 23b connected to the CKI2 terminal, a high-voltage driver 24a connected to a VB1 terminal, and a high-voltage driver 24b connected to a VB2 terminal.

The high-voltage driver 24a has a level shift circuit 25a and a buffer circuit 26a. The high-voltage driver 24b has a level shift circuit 25b and a buffer circuit 26b. The buffer circuit 26a is connected to the HDRV1 terminal and OUT1 terminal (a terminal to provide a first floating potential, i.e., a terminal corresponding to the first terminal). The buffer circuit 26b is connected to the HDRV2 terminal and OUT2 terminal (a terminal to provide a second floating potential, i.e., a terminal corresponding to the second terminal).

The OUT1 terminal is connected to a midpoint of the switching elements Qn1 and Qn2 that are connected in series between the DC power source of 380 V and the ground. The OUT2 terminal is connected to a midpoint of the switching elements Qn3 and Qn4 that are connected in series between the DC power source of 380 V and the ground.

The high-voltage driver 24a (corresponding to the first signal generator) is connected to the OUT1 terminal and generates a first drive signal whose pulse width is substantially equal to that of the first rectangular-wave signal having a duty ratio of less than 50%. The high-voltage driver 24b (corresponding to the second signal generator) is connected to the OUT2 terminal and generates a second drive signal whose pulse width is substantially equal to that of the second rectangular-wave signal having the same pulse width as that of the first rectangular-wave signal and a phase difference of about 180 degrees with respect to the first rectangular-wave signal.

The buffer circuit 27a (corresponding to the third signal generator) is connected to the ground and generates a third drive signal that switches to low level within a period in which the second drive signal becomes low, and thereafter, the first drive signal becomes high, and to high level within a period in which the first drive signal becomes low, and thereafter, the second drive signal becomes high.

The buffer circuit 27b (corresponding to the fourth signal generator) is connected to the ground and generates a fourth drive signal that switches to low level within a period in which the first drive signal becomes low, and thereafter, the second drive signal becomes high, and to high level within a period in which the second drive signal becomes low, and thereafter, the first drive signal becomes high.

The first drive signal is supplied to the gate of the switching element Qn2, the second drive signal to the gate of the switching element Qn4, the third drive signal to the gate of the switching element Qn1, and the fourth drive signal to the gate of the switching element Qn3, to form a full-bridge DC-AC conversion unit to convert DC power into positive-negative symmetrical AC power.

Figure 7:
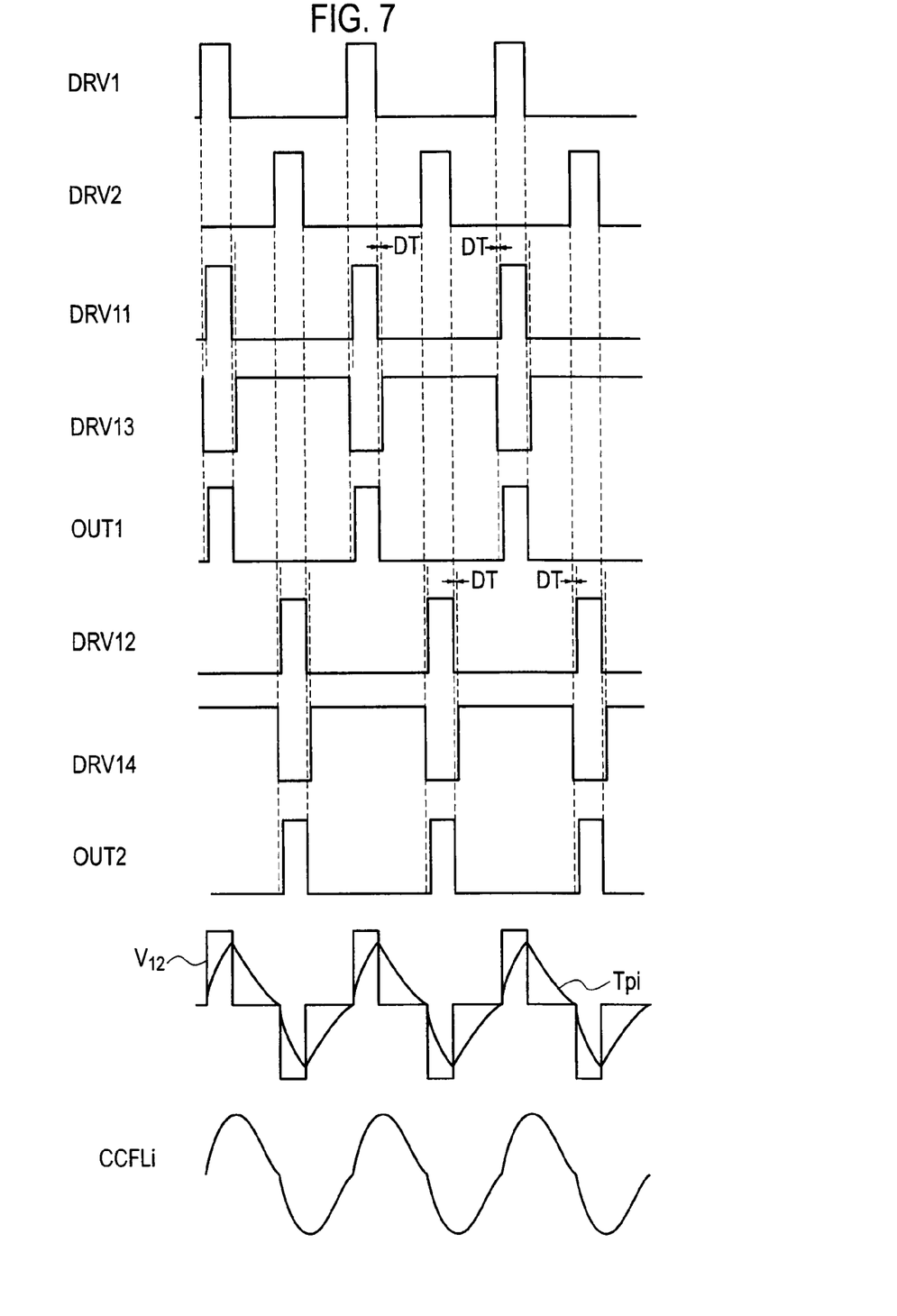
FIG. 7 is an operational waveform diagram illustrating signals concerning the IC 1 arranged in the discharge tube power supply apparatus of Embodiment 1.

Operation of the IC 1 will be explained with reference to operational waveforms of signals illustrated in FIG. 7. When the comparator 21a detects that a voltage to the Vcc terminal is equal to or larger than a start voltage, the internal circuits of the IC1 start to operate and conduct operations mentioned below.

The first rectangular-wave signal DRV1 from the DRV1 terminal of the IC2 is passed through the signal transfer insulated element 14a to the CKI1 terminal and is transferred to the dead time creation circuit 23a. At the same time, the signal DRV1 is inverted by the inverter 22a and the inverted signal is sent to the dead time creation circuit 23a. The dead time creation circuit 23a creates a predetermined dead time between the first rectangular-wave signal and the inverted signal. One of the signals associating with the dead time is level-shifted by the level shift circuit 25a. The resultant signal is supplied through the buffer circuit 26a to the HDRV1 terminal as the first drive signal DRV11. The other of the signals associating with the dead time is supplied through the buffer circuit 27a to the LDRV1 terminal as the third drive signal DRV13.

On the other hand, the second rectangular-wave signal DRV2 from the DRV2 terminal of the IC2 is passed through the signal transfer insulated element 14b to the CKI2 terminal and is transferred to the dead time creation circuit 23b. At the same time, the signal DRV2 is inverted by the inverter 22b and the inverted signal is sent to the dead time creation circuit 23b. The dead time creation circuit 23b creates a predetermined dead time between the second rectangular-wave signal and the inverted signal. One of the signals associating with the dead time is level-shifted by the level shift circuit 25b. The resultant signal is supplied through the buffer circuit 25b to the HDRV2 terminal as the second drive signal DRV12. The other of the signals associating with the dead time is supplied through the buffer circuit 27b to the LDRV2 terminal as the fourth drive signal DRV14.

When the first drive signal DRV11 is high and the third drive signal DRV13 is low, the switching element Qn2 turns on and the switching element Qn1 off. When the second drive signal DRV12 is low and the fourth drive signal DRV14 is high, the switching element Qn3 turns on and the switching element Qn4 off.

As a result, a current passes in a clockwise direction through a path extending along DC380V, Qn2, C3, P1, Qn3, and GND. At the OUT1 terminal, the high-level first drive signal DRV11 appears, and at the OUT2 terminal, a low level appears, so that a voltage V12 between OUT1 and OUT2 becomes the high-level first drive signal DRV11. The H-level voltage V12 passes a current Tpi to the primary winding P1 of the main transformer 12. The current Tpi increases during a period in which the voltage V12 is high, and when the voltage V12 changes to low, decreases to zero.

When the second drive signal DRV12 is high and the fourth drive signal DRV14 is low, the switching element Qn2 turns off and the switching element Qn1 on. When the second drive signal DRV12 is low and the fourth drive signal DRV14 is high, the switching element Qn3 turns off and the switching element Qn4 on.

As a result, a current passes through a path extending along DC380V, Qn4, P1, C3, Qn1, and GND. At the OUT1 terminal, the low-level first drive signal DRV11 appears, and at the OUT2 terminal, a high level appears, so that the voltage V12 between OUT1 and OUT2 becomes equal to the negative H-level first drive signal DRV11. The negative H-level voltage V12 passes the current Tpi to the primary winding P1 of the main transformer 12. The current Tpi decreases during a period in which the voltage V12 is at the negative H-level, and when the voltage V12 changes to low, increases to zero.

When the current Tpi passes through the primary winding P1 of the main transformer 12, the secondary winding S1 generates a voltage, which passes a current CCFLi to the discharge tubes 6.

In this way, the discharge tube power supply apparatus according to Embodiment 1 employs no DC-DC conversion circuit 2 of the related art but it employs the DC-AC conversion circuit 7 to convert DC power into AC power that is supplied to the discharge tubes 6. Consequently, the discharge tube power supply apparatus and semiconductor integrated circuits of the embodiment are highly efficient.

The DC-AC conversion circuit 7 arranges the switching elements Qn1 to Qn4 and the IC1 on the AC power source side, the IC2 on the discharge tube side, the primary winding P1 of the main transformer 12 on the AC power source side, and the secondary winding S1 on the discharge tube side. The IC2 generates a pair of rectangular-wave signals having the same pulse width with a duty ratio of less than 50% and a phase difference of about 180 degrees. The rectangular-wave signals are sent through the signal transfer insulated elements 14a and 14b to the AC power source side. Based on the pair of rectangular-wave signals, the IC1 drives the switching elements Qn1 to Qn4, so that the secondary winding S1 of the main transformer 12 supplies positive-negative symmetrical AC power to the discharge tubes 6. The discharge tube power supply apparatus and semiconductor integrated circuits of the embodiment, therefore, are easy to design and are inexpensive.

If there is an abnormality in the discharge tubes 6 or in the discharge tube side from the secondary winding S1 of the main transformer 12, the window comparators 71 and 72, which are connected to the PRO terminal, and the like stop the IC2, to stop the rectangular-wave control signals provided by the IC2 on the electrically insulated secondary side. This may easily stop power supply to the discharge tubes 6.

To adjust the brightness of the discharge tubes, the rectangular-wave control signals from the IC2 on the electrically insulated secondary side are intermittently generated. The brightness adjustment, therefore, is easy to carry out.

Embodiment 2

Figure 8:
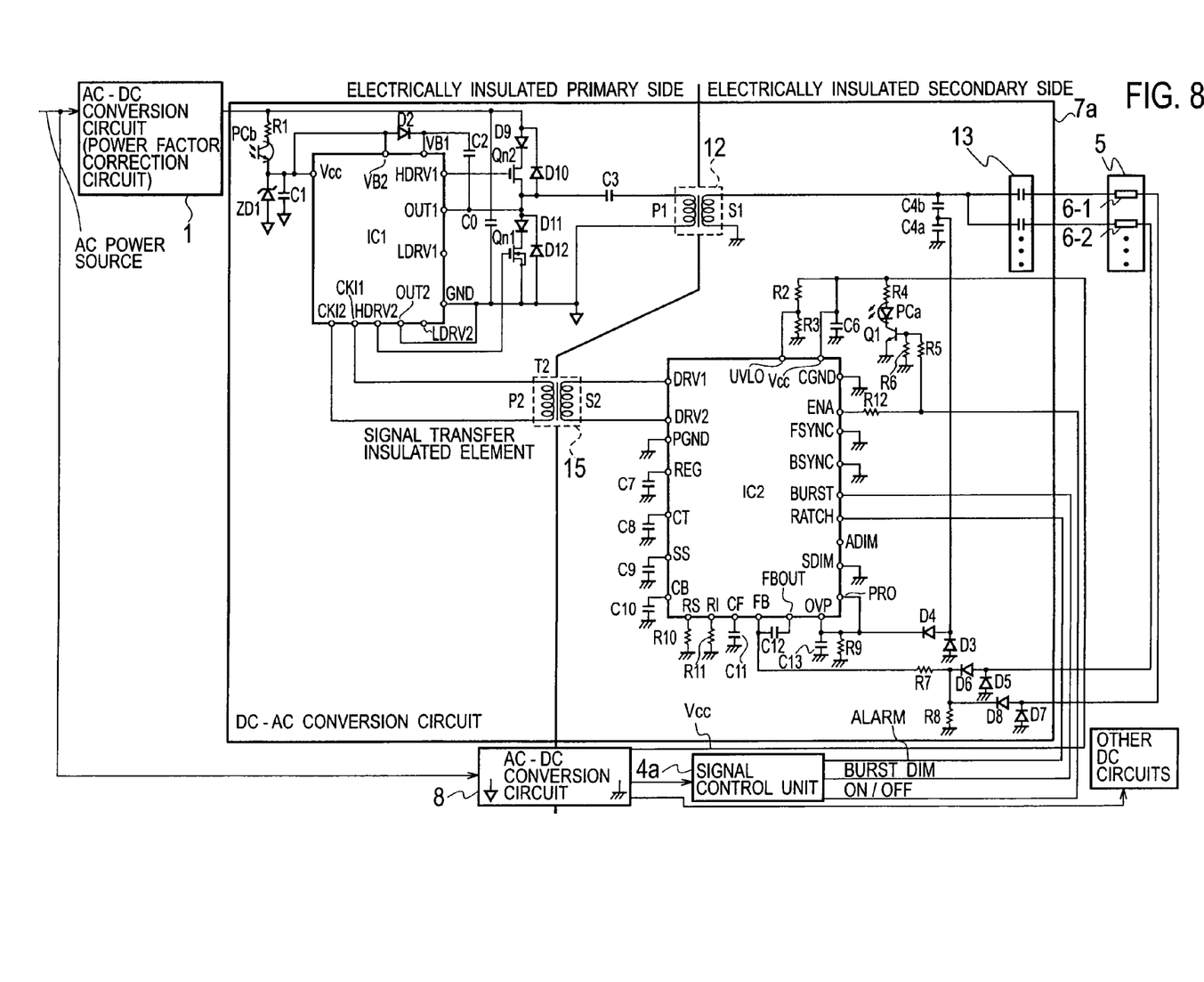
FIG. 8 is a circuit diagram illustrating the configuration of a discharge tube power supply apparatus according to Embodiment 2 of the present invention.

FIG. 8 is a circuit diagram illustrating a discharge tube power supply apparatus according to Embodiment 2 of the present invention. According to Embodiment 1 illustrated in FIG. 2, the IC1 includes the four switching elements Qn1 to Qn4 connected in a full-bridge configuration. Embodiment 2 illustrated in FIG. 8 is characterized in that an IC1 includes two switching elements Qn1 and Qn2 connected in a half-bridge configuration. Between a DC power source of 380 V and the ground, there is connected a series circuit including a diode D9, the switching element Qn2, a diode D11, and the switching element Qn1. Ends of the series circuit having the diode D9 and switching element Qn2 are connected to a diode D10. The series circuit having the diode D11 and switching element Qn1 is connected to a diode D12.

In the IC1, an OUT1 terminal is connected to a midpoint of the switching elements Qn1 and Qn2 that are connected in series between the DC power source of 380 V and the ground and an OUT2 terminal is connected to the ground. A first drive signal is supplied to a gate of the switching element Qn2 and a second drive signal is supplied to a gate of the switching element Qn1, to form a half-bridge DC-AC conversion unit to convert DC power into positive-negative symmetrical AC power.

A signal transfer insulated element 15 is a transformer having an input winding S2 to receive rectangular-wave signals from DRV1 and DRV2 terminals of an IC2 and an output winding P2 connected to CKI1 and CKI2 terminals of the IC1.

The discharge tube power supply apparatus of Embodiment 2 employing the switching elements Qn1 and Qn2 of half-bridge configuration provides effects similar to those provided by the discharge tube power supply apparatus of Embodiment 1 and is inexpensive.

Embodiment 3

Figure 9:
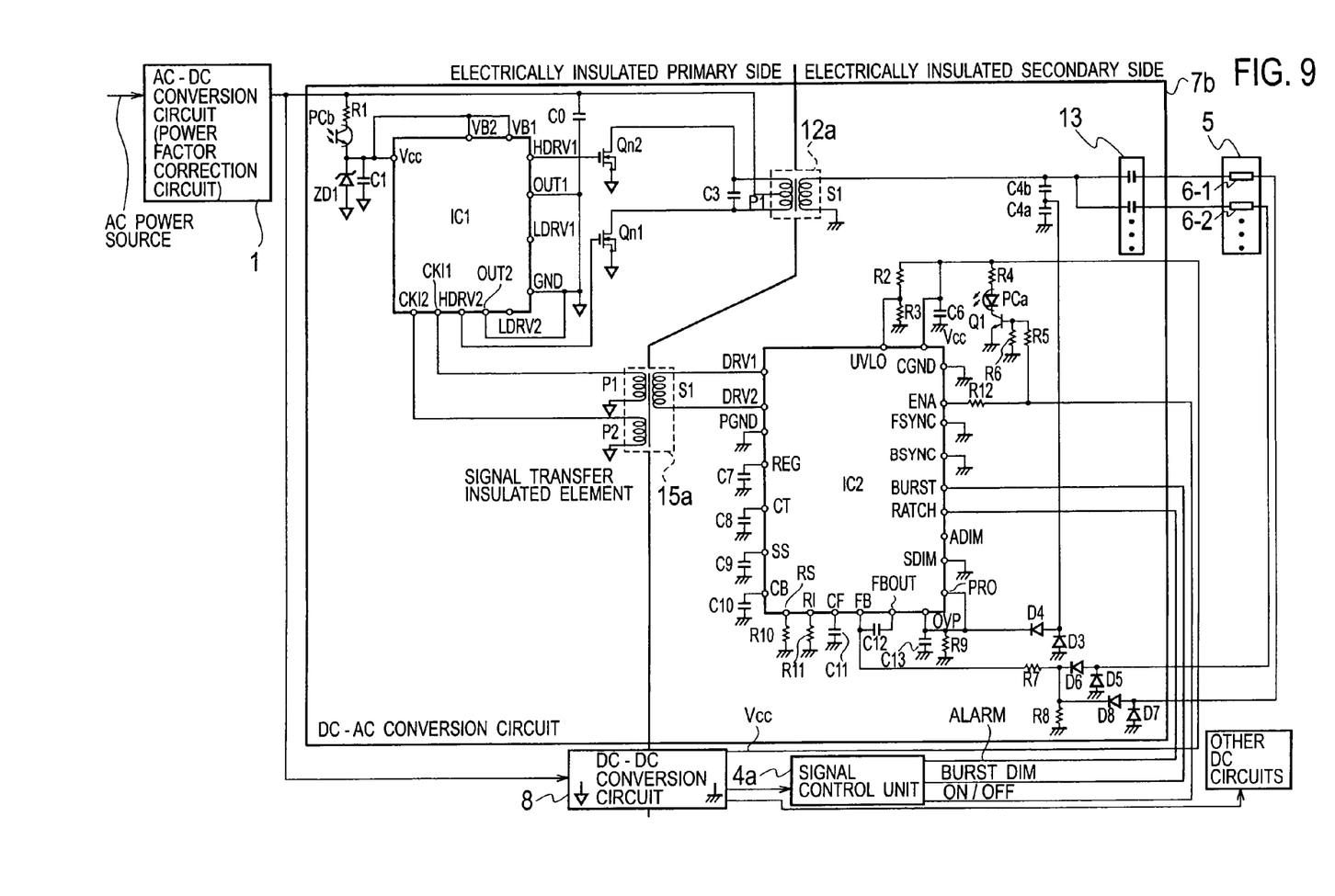
FIG. 9 is a circuit diagram illustrating the configuration of a discharge tube power supply apparatus according to Embodiment 3 of the present invention.

FIG. 9 is a circuit diagram illustrating a discharge tube power supply apparatus according to Embodiment 3 of the present invention. According to Embodiment 1 illustrated in FIG. 2, the IC1 includes the four switching elements Qn1 to Qn4 connected in a full-bridge configuration. Embodiment 3 illustrated in FIG. 9 is characterized in that an IC1 includes two switching elements Qn1 and Qn2 connected in a push-pull configuration. Namely, a midpoint of a primary winding P1 of a main transformer 12a is connected to a DC power source of 380 V, ends of the primary winding P1 are connected to a capacitor C3, a drain of the switching element Qn2 is connected to an end of the primary winding P1, and a drain of the switching element Qn1 is connected to the other end of the primary winding P1. A source of the switching element Qn2 and a source of the switching element Qn1 are connected to the ground.

In the IC1, OUT1 and OUT2 terminals are connected to the ground. First and second drive signals are supplied to gates of the switching elements Qn1 and Qn2, respectively. The switching elements Qn1 and Qn2 are connected to ends of the center-tap main transformer 12a whose center tap on the primary side is connected to the DC power source. This forms a push-pull DC-AC conversion unit to convert DC power into positive-negative symmetrical AC power.

A signal transfer insulated element 15a is a transformer having an input winding S1 to receive rectangular-wave signals from DRV1 and DRV2 terminals of an IC2, an output winding P1 connected to a CKI1 terminal of the IC1, and an output winding P2 connected to a CKI2 terminal of the IC1.

The discharge tube power supply apparatus according to Embodiment 3 employing the switching elements Qn1 and Qn2 of push-pull configuration provides effects similar to those provided by the discharge tube power supply apparatus of Embodiment 1 and is inexpensive.

As illustrated in FIGS. 2, 8, and 9, the IC1 may change connections to switch the three power conversion modes (full-bridge, half-bridge, push-pull) from one to another.

The present invention is not limited to the discharge tube power supply apparatuses of Embodiments 1 to 3. According to Embodiments 1 to 3, the AC-DC conversion circuit 1 is a power factor correction circuit. Instead, the AC-DC conversion circuit 1 may be a rectifying-smoothing circuit having bridge diodes and a capacitor.

The DC conversion circuit for supplying a DC voltage to the signal control unit 4a may be formed by connecting the DC-DC conversion circuit 8 after the AC-DC conversion circuit 1, as illustrated in FIG. 2. To further improve efficiency, an AC-DC conversion circuit may be connected before the AC-DC conversion circuit 1, as illustrated in FIG. 8.

The current dividing circuit 13 may employ capacitors to divide a current, or a current transformer to divide a current. The main transformer 12 may be a piezoelectric transformer. An auxiliary winding transformer or an inductance may be supplementally arranged before or after the piezoelectric transformer.

EFFECT OF INVENTION

According to the present invention, the discharge tube power supply apparatuses and semiconductor integrated circuits employ AC conversion circuits to convert DC power into AC power without using DC-DC conversion circuits and supply the AC power to discharge tubes. Accordingly, the apparatuses and integrated circuits are highly efficient.

The AC conversion circuit arranges a plurality of switching elements and a drive unit on an AC power source side, a control unit on a discharge tube side, a primary winding of a main transformer on the AC power source side, and a secondary winding on the discharge tube side. The control unit generates a pair of rectangular-wave signals having the same pulse width with a duty ratio of less than 50% and a phase difference of about 180 degrees. The rectangular-wave signals are sent through one or more signal transfer insulated elements to the AC power source side. Based on the pair of rectangular-wave signals, the drive unit drives the plurality of switching elements, so that the secondary winding of the transformer supplies positive-negative symmetrical AC power to the discharge tubes. Accordingly, the discharge tube power source apparatuses and semiconductor integrated circuits of the present invention are easy to design and are inexpensive.

UNITED STATES DESIGNATION

In connection with United States designation, this international patent application claims the benefit of priority under 35 U.S.C. 119(a) to Japanese Patent Application No. 2007-134089 filed on May 21, 2007, the entire content of which is incorporated by reference herein.

The invention claimed is:

1. A discharge tube power supply apparatus comprising a DC conversion circuit for converting AC power of an AC power source into DC power and an AC conversion circuit for converting the converted DC power into AC power and supplying the converted AC power to a discharge tube the AC conversion circuit including:
 a main transformer having a primary winding arranged on an AC power source side and a secondary winding arranged on a discharge tube side, the primary and secondary windings electrically insulating the AC power source side and the discharge tube side from each other;
 a drive unit arranged on the AC power source side;
 a plurality of switching elements arranged on the AC power source side and driven by the drive unit, to pass a current through the primary winding of the main transformer based on the DC power;
 a control unit arranged on the discharge tube side, configured to generate at least a pair of rectangular-wave signals those are used for conducting PWM control on the current passing through the discharge tube and have the same pulse width with a duty ratio of less than 50% and a phase difference of about 180 degrees; and
 one or more signal transfer insulated elements configured to send the pair of rectangular-wave signals from the control unit to the drive unit, wherein
the drive unit drives the plurality of switching elements according to the pair of rectangular-wave signals from the one or more signal transfer insulated elements, so that positive-negative symmetrical AC power is supplied from the secondary winding of the main transformer to the discharge tube, wherein
as an abnormality at the discharge tube or at any location on the discharge tube side from the secondary winding of the main transformer occurs, the control unit stops sending the rectangular-wave signals to the drive unit, to thereby stop power supply to the discharge tube.

2. A discharge tube power supply apparatus comprising a DC conversion circuit for converting AC power of an AC power source into DC power and an AC conversion circuit for converting the converted DC power into AC power and supplying the converted AC power to a discharge tube the AC conversion circuit including:
 a main transformer having a primary winding arranged on an AC power source side and a secondary winding arranged on a discharge tube side, the primary and secondary windings electrically insulating the AC power source side and the discharge tube side from each other;
 a drive unit arranged on the AC power source side;
 a plurality of switching elements arranged on the AC power source side and driven by the drive unit, to pass a current through the primary winding of the main transformer based on the DC power;
 a control unit arranged on the discharge tube side, configured to generate at least a pair of rectangular-wave signals those are used for conducting PWM control on the current passing through the discharge tube and have the same pulse width with a duty ratio of less than 50% and a phase difference of about 180 degrees; and
 one or more signal transfer insulated elements configured to send the pair of rectangular-wave signals from the control unit to the drive unit, wherein
the drive unit drives the plurality of switching elements according to the pair of rectangular-wave signals from the one or more signal transfer insulated elements, so that positive-negative symmetrical AC power is supplied from the secondary winding of the main transformer to the discharge tube, wherein
in case of adjusting the brightness of the discharge tube, the control unit intermittently outputs the rectangular-wave signals.

3. The discharge tube power supply apparatus of claim 1 or 2, wherein:
 the control unit includes a full-bridge circuit having first to fourth switching elements of bridge configuration;
 the signal transfer insulated elements are included in a transformer having an input winding connected in series between outputs of the full-bridge circuit and one or two output windings connected to the drive unit; and
 the full-bridge circuit applies the pair of rectangular-wave signals to ends of the input winding, so that the pair of rectangular-wave signals are sent through the output winding to the drive unit.

4. The discharge tube power supply apparatus of claim 1 or 2, wherein:
 the plurality of switching elements are first and second switching elements of bridge configuration to form a half-bridge circuit; and
 the drive unit drives the first and second switching elements according to the pair of rectangular-wave signals.

5. The discharge tube power supply apparatus of claim 4, wherein
 the drive unit level-shifts one of the pair of rectangular-wave signals, to send a drive signal to a control terminal of the high-side switching element of the half-bridge circuit.

6. The discharge tube power supply apparatus of claim 1 or 2, wherein:
 the plurality of switching elements are first to fourth switching elements of bridge configuration to form a full-bridge circuit; and
 the drive unit drives the first to fourth switching elements according to the pair of rectangular-wave signals.

7. The discharge tube power supply apparatus of claim 6, wherein
 the drive unit level-shifts both the pair of rectangular-wave signals, to send drive signals to control terminals of the high-side switching elements of the full-bridge circuit.

8. The discharge tube power supply apparatus of claim 6, wherein the drive unit has a dead time creation circuit to create a predetermined dead time between two signals that drive a pair of switching elements connected in series among the plurality of switching elements of the full-bridge circuit.

9. A discharge tube power supply apparatus comprising a DC conversion circuit for converting AC power of an AC power source into DC power and an AC conversion circuit for converting the converted DC power into AC power and supplying the converted AC power to a discharge tube the AC conversion circuit including:
- a main transformer having a primary winding arranged on an AC power source side and a secondary winding arranged on a discharge tube side, the primary and secondary windings electrically insulating the AC power source side and the discharge tube side from each other;
- a drive unit arranged on the AC power source side;
- a plurality of switching elements arranged on the AC power source side and driven by the drive unit, to pass a current through the primary winding of the main transformer based on the DC power;
- a control unit arranged on the discharge tube side, configured to generate at least a pair of rectangular-wave signals those are used for conducting PWM control on the current passing through the discharge tube and have the same pulse width with a duty ratio of less than 50% and a phase difference of about 180 degrees; and
- one or more signal transfer insulated elements configured to send the pair of rectangular-wave signals from the control unit to the drive unit, wherein the drive unit drives the plurality of switching elements according to the pair of rectangular-wave signals from the one or more signal transfer insulated elements, so that positive-negative symmetrical AC power is supplied from the secondary winding of the main transformer to the discharge tube, wherein:

the plurality of switching elements include a first switching element connected to a first end of the primary winding of the main transformer and a second switching element connected to a second end of the primary winding of the main transformer, to form a push-pull circuit and the DC power is supplied to a midpoint of the primary winding of the main transformer; and the drive unit drives the first and second switching elements according to the pair of rectangular-wave signals.

10. The discharge tube power supply apparatus of claim 1 or 2, wherein
the DC conversion circuit is a power factor correction circuit.

11. The discharge tube power supply apparatus of claim 1 or 2, wherein
the DC conversion circuit is a rectifying-smoothing circuit having bridge diodes and a capacitor.

\* \* \* \* \*